(12) United States Patent
Fujita

(10) Patent No.: US 8,345,209 B2
(45) Date of Patent: Jan. 1, 2013

(54) DISPLAY DEVICE

(75) Inventor: Yasuo Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 875 days.

(21) Appl. No.: 12/482,029

(22) Filed: Jun. 10, 2009

(65) Prior Publication Data

US 2009/0309813 A1 Dec. 17, 2009

(30) Foreign Application Priority Data

Jun. 11, 2008 (JP) ................................. 2008-152454

(51) Int. Cl.
*G02F 1/1343* (2006.01)
(52) U.S. Cl. ...................................................... 349/146
(58) Field of Classification Search .................... 349/146
See application file for complete search history.

(56) References Cited

U.S. PATENT DOCUMENTS

| | | | | |
|---|---|---|---|---|
| 2006/0077191 | A1* | 4/2006 | Ming-Daw et al. | 345/204 |
| 2006/0262235 | A1* | 11/2006 | Vogels et al. | 349/10 |
| 2008/0068520 | A1* | 3/2008 | Minikey et al. | 349/11 |
| 2008/0088568 | A1* | 4/2008 | Haga et al. | 345/100 |
| 2010/0214195 | A1 | 8/2010 | Ogasawara et al. | |

FOREIGN PATENT DOCUMENTS

| | | |
|---|---|---|
| JP | 2006-276580 | 10/2006 |
| JP | 2007-283938 A | 11/2007 |
| WO | WO 2009/057342 A1 | 5/2009 |

OTHER PUBLICATIONS

Japanese Office Action Issued Jul. 3, 2012 in Patent Application No. 2008-152454 (with partial English translation).

\* cited by examiner

*Primary Examiner* — Timothy L Rude
(74) *Attorney, Agent, or Firm* — Oblon, Spivak, McClelland, Maier & Neustadt, L.L.P.

(57) ABSTRACT

A display device in accordance with an exemplary aspect of the present invention includes a non-rectangular display area, a frame area surrounding the display area, a plurality of picture elements arranged in the display area, and a plurality of effective display areas having respective colors provided in the picture elements, wherein each of the plurality of effective display areas having respective colors provided in the picture element located in a boundary portion of the display area (display-area edge) is formed such that aperture ratios are the same within one picture element and that center lines in terms of a second direction (longitudinal direction) perpendicular to a first direction along which each color of the effective display areas having respective colors is lined up are located on an extension line of the center line of effective display areas provided in the picture element adjacent in a first direction (lateral direction).

6 Claims, 5 Drawing Sheets

DISPLAY DEVICE

BACKGROUND OF THE INVENTION

1. Field of the Invention

The present invention relates to a display device, in particular a display device having a non-rectangular display area.

2. Description of Related Art

In recent years, various types of devices equipped with a display device have become widespread. As better design and fashion suited to user's taste have been desired in these devices, the shapes of the devices have changed to satisfy such desires.

To cope with such a trend, some contrivance is sometimes made on the display area of such display devices. Although the display area usually has a rectangular shape, display areas having non-rectangular shapes such as circular and oval shapes have been also known.

In a display device, pixels are typically arranged in a matrix. Therefore, in a display device having a circular or oval shaped display area or the like, pixels located in the boundary portion of the display area are shielded in a circular arc shape. In such a case, since pixels having respective colors contained in one picture element are shielded in such a manner that their aperture ratios become unbalanced, the color balance of picture elements located on the edge of the display area becomes disrupted. In this way, color shift occurs on the edge of the display area, and thus deteriorating the display quality.

Several techniques have been disclosed in an attempt to solve the above-mentioned problem. FIG. 7 is a top view schematically illustrating a structure of an edge portion of the display area of a liquid crystal display device in accordance with related art 1 disclosed in Japanese Unexamined Patent Publication Application No. 2006-276580. In FIG. 7, an edge portion in the vicinity of the upper-right portion of an oval-shaped display area 1 is shown. Therefore, in FIG. 7, the display area 1 is shown on the lower-left side of the display-area edge 3, and a frame area 2 is shown on the upper-right side of the edge 3. In the related art 1, the line width of the black matrix on the color filter substrate is adjusted, as shown in FIG. 7, so that in a picture element 5 in which the pixels shielded by the frame area 2 are located, the aperture ratios of the pixels having respective colors become even. In this way, the color balance within a picture element 5, in which the pixel aperture ratios of the effective display areas 4R, 4G and 4B having respective colors are uneven since it contains pixels shielded by the frame area 2, becomes stable. Therefore, the occurrence of color shift on the display-area edge 3 can be prevented.

Meanwhile, FIG. 8 is a top view schematically illustrating a structure of an edge portion of the display area of a liquid crystal display device in accordance with related art 2. As in the case of FIG. 7, an edge portion in the vicinity of the upper-right portion of an oval-shaped display area 1 is shown in FIG. 8. Therefore, in FIG. 8, the display area 1 is shown on the lower-left side of the display-area edge 3, and a frame area 2 is shown on the upper-right side of the edge 3. In the related art 2, the pixels contained in all the picture elements 5, in which at least one pixel is shielded by the frame area 2, are turned off as shown in FIG. 8. In this way, picture elements 5, in which the pixel aperture ratios of the effective display areas 4R, 4G and 4B having respective colors are uneven since it contains pixels shielded by the frame area 2, are not displayed. Therefore, the occurrence of color shift on the display-area edge 3 can be prevented.

However, in the related art 1, the positions of the center lines 6, each of which is defined as a line vertically dividing the effective display area 4 into two parts having the same size, are different among picture elements adjacent to one another in the lateral direction of FIG. 7 depending on the level at which they are shielded by the frame area 2. Therefore, when a laterally straight line is displayed, the line does not become straight but becomes curved at the edge portion of the display area 1. Meanwhile, in the related art 2, the center lines 6 of the picture elements 5 arranged in the lateral direction become straight. Therefore, when a laterally straight line is displayed, the line is not curved at the edge portion of the display area 1. However, since the picture elements 5 in which at least one pixel is shielded by the frame area 2 are all turned off, it is impossible to form the outside shape of the display area 1 in a smooth oval or circular shape.

The present invention has been made to solve the above-mentioned problems, and an exemplary object of the present invention is to provide, in display devices having display areas having non-rectangular shapes such as circular and oval shapes, a display device having a display area with a smooth outside shape and an excellent display quality.

SUMMARY OF THE INVENTION

In accordance with an exemplary aspect of the present invention, a display device includes: a non-rectangular display area; a frame area surrounding the display area; a plurality of picture elements arranged in the display area; and a plurality of effective display areas having respective colors provided in the picture elements, wherein each of the plurality of effective display areas having respective colors provided in the picture element located in a boundary portion of the display area is formed such that aperture ratios are the same within one picture element and that center lines in terms of a second direction perpendicular to a first direction along which each color of the effective display areas having respective colors is lined up are located on an extension line of the center line of effective display areas provided in the picture element adjacent in the first direction.

The present invention can provide, in display devices having display areas having non-rectangular shapes such as circular and oval shapes, a display device having a display area with a smooth outside shape and an excellent display quality.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Preferred exemplary embodiments in accordance with the present invention are explained hereinafter. The following explanation is made only for explanatory purposes, and the present invention is not limited to the following exemplary embodiments. In the following description and the drawings, omission and simplification are made as appropriate for simplifying the explanation. Furthermore, duplicated explanation is also omitted as required for simplifying the explanation. It should be noted that the same signs are assigned to the same or similar components throughout the drawings, and their explanation is omitted as appropriate.

First Exemplary Embodiment

Figure 1:
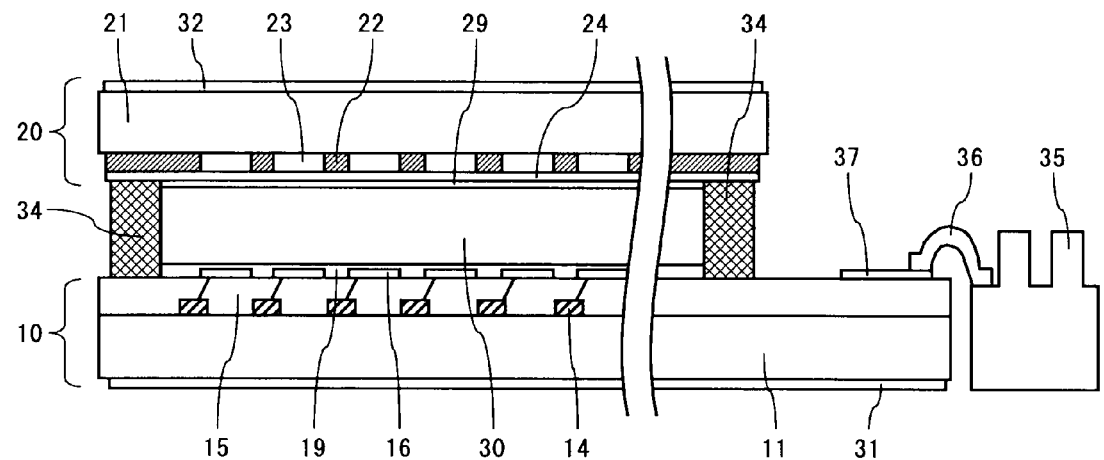
FIG. 1 is a cross sectional view of a liquid crystal display device in accordance with a first exemplary embodiment of the present invention.

Firstly, a display device in accordance with a first exemplary embodiment of the present invention is explained with reference to FIG. 1. FIG. 1 is a cross sectional view of a liquid crystal display device in accordance with this exemplary embodiment. Although a display device in accordance with this exemplary embodiment is explained by taking an active matrix type liquid crystal display device having TFTs (Thin Film Transistors) as an example, switching elements other than the TFTs may be also used. Furthermore, the display device may be a passive matrix type liquid crystal display device. It should be noted that the present invention is not limited to liquid crystal display devices. That is, the present invention is applicable to any display device in which displaying is implemented by display material such as liquid crystal, particles, and liquid.

In FIG. 1, an array substrate 10 and an opposing substrate 20 are arranged opposite to each other in a liquid crystal display device in accordance with this exemplary embodiment of the present invention. Further, it has such a structure that liquid crystal 30 is sealed in space defined by both substrates and sealing material 34 used to bond these substrates together. In the liquid crystal display device in accordance with this exemplary embodiment, a display area having a non-rectangular shape such as a circle and an oval is formed. The sealing material 34 is formed so as to surround this display area. The sealing material 34 may have a shape conforming to the shape of the display area. However, the sealing material 34 may have other shapes different from the shape of the display area, such as a frame shape.

In the array substrate 10, pixel electrodes 16 that form the display area on a substrate 11, scanning signal lines (not shown), and video signal lines (not shown) are formed with an insulating film 15 interposed between each component. The plurality of scanning signal lines (gate lines) are arranged in parallel. Similarly, the plurality of video signal lines (source lines) are also arranged in parallel. The scanning signal lines and the video signal lines are formed so as to cross each other. The scanning signal lines and the video signal lines cross each other. An area defined by neighboring scanning signal lines and video signal lines becomes a pixel. Consequently, the pixels are arranged in a matrix. Each pixel electrode 16 is formed over roughly the entire area of each pixel. In the following explanation, an area defined by scanning signal lines and video signal lines is called "pixel".

A TFT 14 that is used as a switching element is disposed in the vicinity of the intersection of the scanning signal line and the video signal line. TFTs 14 are arranged in an array on the array substrate 10. Each TFT 14 includes a drain electrode and a source electrode, both of which are formed by the same layer as the video signal lines. The source electrode and the drain electrode are connected with each other through a semiconductor layer. A video signal line and a pixel electrode 16 are connected through this TFT 14. Therefore, by bringing the TFT 14 into an On-state by a scanning signal, a display signal is supplied from the video signal line to the pixel electrode 16. For example, a bottom gate type TFT 14 may be used in this exemplary embodiment of the present invention.

An alignment layer 19 that is used to align the liquid crystal 30 is stacked over the pixel electrode 16. A polarization plate 31 is adhered on the outside of the substrate 11. Furthermore, terminals 37 from which external signals are supplied to the TFTs 14 are provided on the array substrate 10.

With regard to the opposing substrate 20, a black matrix (BM) 22 that is composed of pigments or metal such as chromium and is used to shield a light is formed on the surface of a substrate 21 that is opposed to the array substrate 10. Further, a colored layer 23 composed of pigments or dyes is formed so as to fill the openings formed in the black matrix 22. The colored layer 23 is, for example, color filters of R (Red), G (Green), and B (Blue). Furthermore, an opposing electrode 24 is formed over roughly the entire surface of the opposing substrate 20 so as to cover the black matrix 22 and the colored layer 23. The opposing electrode 24 generates electric fields with the pixel electrodes 16 of the array substrate 10, and thereby driving the liquid crystal 30. Furthermore, an alignment layer 29 that is used to align the liquid crystal 30 is stacked over the surface of the opposing substrate 20 that comes in contact with the liquid crystal 30. Note that a polarization plate 32 is adhered on the outside of the substrate 21.

The array substrate 10 and the opposing substrate 20 are attached together with the sealing material 34. Transparent insulating substrates such as glass substrates and quartz glass substrates may be used as the substrates 11 and 21. Photocurable or thermosetting acrylic resin or epoxy resin, or ultraviolet-curable resin or the like may be used as the sealing material 34. Furthermore, the liquid crystal display device in accordance with this exemplary embodiment of the present invention also includes a control substrate 35 for generating driving signals, a FFC (Flexible Flat Cable) 36 for electrically connecting the control substrate 35 to the terminal electrodes 37, a backlight unit (not shown) and the like.

In the liquid crystal display device like this, when an electrical signal is input from the control substrate 35, a drive voltage is applied between the pixel electrode 16 and the opposing electrode 24. Then, the orientation of molecules of the liquid crystal 30 is changed in accordance with the drive voltage. The light irradiated from the backlight unit is externally transmitted or shielded through or by the array substrate 10, the liquid crystal 30, and the opposing substrate 20, and therefore an image or the like is displayed on the liquid crystal display device. That is, by varying the drive voltage on a pixel-by-pixel basis, a desired image can be displayed. Note that in this specification, an area capable of contributing to the actual displaying, among all the pixels defined by the scanning signal lines and the video signal lines, is called "effective display area". Therefore, an area where, when brightly displayed, the light from the backlight unit is not shielded by the black matrix 22 or the like and actually transmitted to the outside becomes the effective display area in liquid crystal display devices.

TN (Twisted Nematic) mode, STN (Super Twisted Nematic) mode, VA (Vertical Alignment) mode, or a ferroelectric liquid crystal mode or the like may be used for the operating mode of the liquid crystal display device. Furthermore, the display device may be a liquid crystal display device with an in-plane electric field mode such as IPS (In-Plane Switching) mode and FFS (Fringe Field Switching) mode and the like in which the opposing electrode 24 provided in the opposing substrate 20 is disposed on the side of array substrate 10 and electric fields are horizontally applied to the liquid crystal 30 between the opposing electrode 24 and the pixel electrode 16. Furthermore, the present invention is also applicable to reflective-type liquid crystal display device and transflective-type liquid crystal display devices used for both transmissive and reflective types, in addition to transmissive-type liquid crystal display devices.

Figure 2:
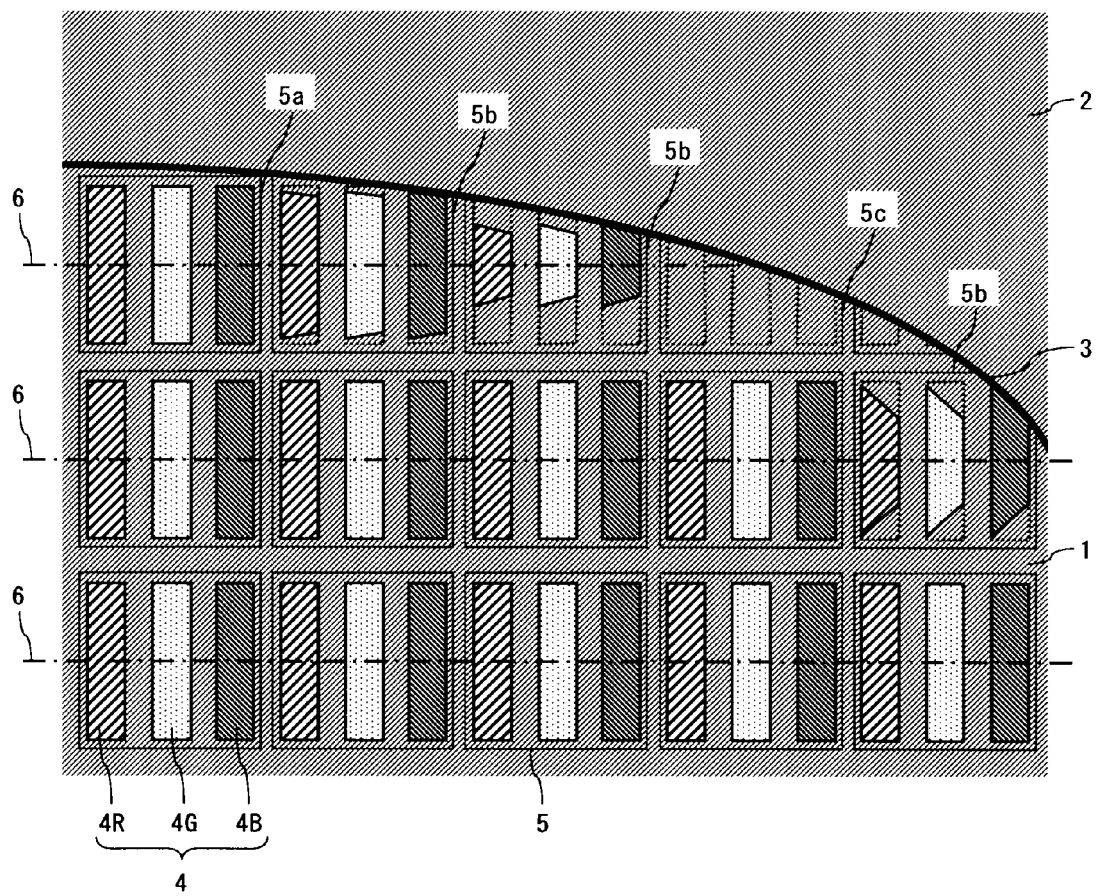
FIG. 2 is a top view schematically illustrating a structure of an edge portion of the display area of the liquid crystal display device in accordance with the first exemplary embodiment of the present invention.

Next, a structure of a display area in accordance with this exemplary embodiment of the present invention is explained hereinafter with reference to FIG. 2. FIG. 2 is a top view schematically illustrating a structure of an edge portion of the display area of the liquid crystal display device in accordance with the first exemplary embodiment of the present invention. In FIG. 2, an edge portion of the display area as viewed from the top in FIG. 1 is shown. Note that a situation where all the effective display areas are brightly displayed is shown in FIG. 2 for the sake of explanation.

In the liquid crystal display device in accordance with this exemplary embodiment, a display area 1 having a non-rectangular shape such as a circle and an oval is provided. Further, a frame area 2 is provided so as to surround this non-rectangular display area 1. In the frame area 2, the light from the light source is shielded by a black matrix 22 or the like formed on the opposing substrate 20. In FIG. 2, an edge portion in the vicinity of the upper-right portion of an oval-shaped display area 1 is shown. Therefore, in FIG. 2, the display area 1 is shown on the lower-left side, and the frame area 2 is shown on the upper-right side. That is, the display area 1 and the frame area 2 are provided on the inside and the outside, respectively, of a curved display-area edge 3.

A plurality of effective display areas 4 are arranged in a matrix in the display area 1. In FIG. 2, effective display areas 4R, 4G and 4B composed of R, G and B respectively are provided. For example, opening portions in the black matrix 22 formed on the opposing substrate 20 serve as the effective display areas 4. Therefore, openings in which an R-colored layer 23 is provided serve as effective display areas 4R, openings in which a G-colored layer 23 is provided serve as effective display areas 4G, and openings in which a B-colored layer 23 is provided serve as effective display areas 4B. The effective display areas 4R, 4G and 4B are arranged in a stripe pattern. Therefore, in FIG. 2, effective display areas 4 having the same color are arranged such that they are adjacent to one another in the longitudinal direction. Further, the respective colors of the effective display areas 4 are arranged such that they are lined up in the lateral direction in FIG. 2. The effective display areas 4R, 4G and 4B having different colors are arranged such that they are arranged in a repetitive pattern in the lateral direction in FIG. 2.

A picture element 5 is composed of these effective display areas 4R, 4G and 4B. That is, each color of the effective display areas 4R, 4G and 4B are provided in one picture element 5. In this way, a base display unit composed of a set of effective display areas 4 having R, G and B becomes a picture element 5. Consequently, a plurality of picture elements 5 are arranged in a matrix in the display area 1. Furthermore, an area capable of contributing to the actual displaying in each pixel becomes the effective display area 4, and therefore the effective display area 4 is provided within each pixel. In this example, the ratio of the area occupied by the effective display area 4 to the entire area of one pixel is adjusted in such a manner that the ratios of the respective colors within one picture element 5 are even. In the following explanation, the ratio of the area occupied by the effective display area 4 to the entire area of one pixel is called "pixel aperture ratio". That is, the pixel aperture ratios of the effective display areas 4R, 4G and 4B of RGB contained in one picture element 5 are adjusted so that they become equal to each other.

Figure 3:
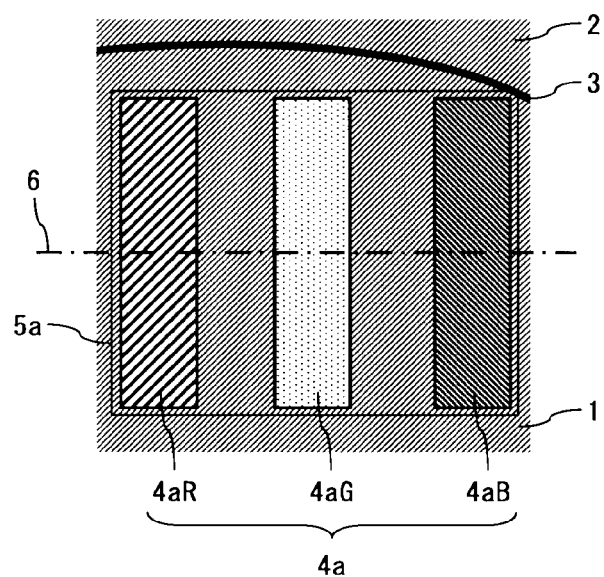
FIG. 3 is an enlarged view illustrating a normal picture element disposed on an edge of the display area of the liquid crystal display device in accordance with the first exemplary embodiment of the present invention.
Figure 4:
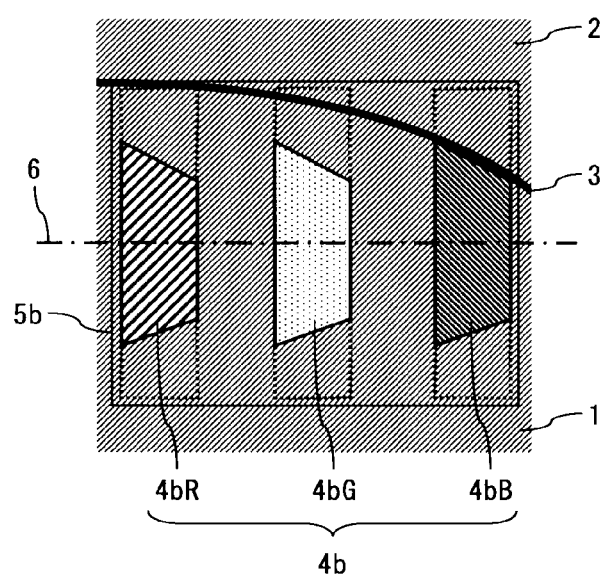
FIG. 4 is an enlarged view illustrating a picture element whose aperture ratio is adjusted and which is disposed on an edge of the display area of the liquid crystal display device in accordance with the first exemplary embodiment of the present invention.
Figure 5:
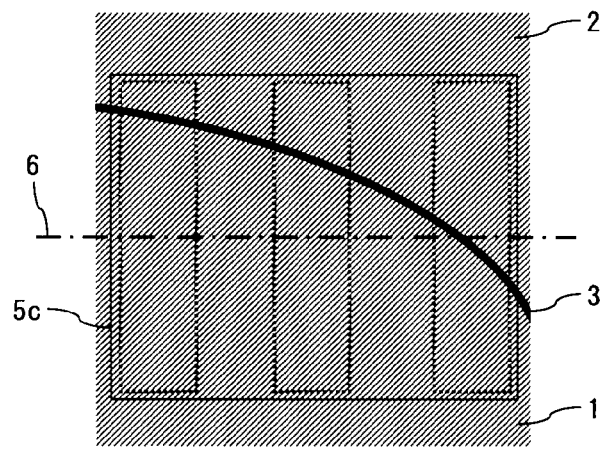
FIG. 5 is an enlarged view illustrating a turned-off picture element disposed on an edge of the display area of the liquid crystal display device in accordance with the first exemplary embodiment of the present invention.

The picture element 5 located in a boundary portion of the display area 1, i.e., the picture element 5 adjacent to the display-area edge 3 is explained hereinafter in detail with reference to FIGS. 3 to 5. FIG. 3 is an enlarged view illustrating a normal picture element 5a disposed on the display-area edge 3 of the liquid crystal display device in accordance with the first exemplary embodiment. FIG. 4 is an enlarged view illustrating a picture element 5b whose aperture ratio is adjusted and which is disposed on the display-area edge 3 of the liquid crystal display device in accordance with the first exemplary embodiment. Furthermore, FIG. 5 is an enlarged view illustrating a turned-off picture element 5c disposed on the display-area edge 3 of the liquid crystal display device in accordance with the first exemplary embodiment.

The display area 1 in accordance with this exemplary embodiment has a non-rectangular shape. Therefore, in picture elements 5 located in the boundary portion of this display area 1, some portions of pixels constituting these picture elements 5 overlap with the frame area 2. Therefore, in this exemplary embodiment of the present invention, one of a normal picture element 5a, an aperture-ratio-adjusted picture element 5b, and a turned-off picture element 5c is selected for each picture element 5 located in the boundary portion of the display area 1 depending on the level at which the pixel and the frame area 2 overlap each other.

In the normal picture element 5a, effective display areas 4a having the same shape as effective display areas 4 provided in the picture element 5 located in areas other than the boundary portion of the display area 1 are provided as shown in FIGS. 2 and 3. That is, the normal picture element 5a has substantially the same pixel aperture ratio as that of the picture element 5 located in areas other than the outermost area of the display area 1. Therefore, the pixel aperture ratios of the effective display areas 4aR, 4aG and 4aB having the respective colors contained in one normal picture element 5a become even as in the case of the effective display areas 4R, 4G and 4B contained in the picture element 5 located in areas other than the boundary portion of the display area 1. This normal picture element 5a is provided in picture elements 5 in which any pixel contained in those picture elements does not overlap with the frame area 2 among all the picture elements 5 located in the boundary portion of the display area 1.

In the aperture-ratio-adjusted picture element 5b, effective display areas 4b smaller than effective display areas 4 provided in the picture element 5 located in areas other than the boundary portion of the display area 1 is provided as shown in FIGS. 2 and 4. That is, the aperture-ratio-adjusted picture element 5b has a lower pixel aperture ratio than that of the picture element 5 located in areas other than the outermost area of the display area 1. In other words, the effective display area 4b is the one that is created by turning off parts formed within the effective display area 4 of the picture element 5 located in an area other than the boundary portion of the display area 1. In FIGS. 2 and 4, these partially turned-off portions are indicated by dotted lines. Note that in FIG. 2, turned-off portions located in the frame area 2 are omitted in the drawing. In the turned-off portions, the light from the light source is shielded by, for example, the black matrix 22 or the like formed on the opposing substrate 20. The effective display areas 4bR, 4bG and 4bB having the respective colors contained in one aperture-ratio-adjusted picture element 5b are formed in the identical shapes. Therefore, the pixel aperture ratios of the effective display areas 4bR, 4bG and 4bB having the respective colors contained in one aperture-ratio-adjusted picture element 5b become even as in the case of the effective display areas 4R, 4G and 4B contained in picture elements 5 located in areas other than the boundary portion of the display area 1. In this way, unevenness in the color balance of the aperture-ratio-adjusted picture element 5b can be prevented.

Here, a first direction is defined as the direction along which the respective colors are lined up (horizontal direction in the figure). Further, a second direction is defined as the direction perpendicular to the first direction and along which adjacent effective display areas 4 having the same colors are arranged (vertical direction in the figure). As shown in FIG. 4, the effective display areas 4b are also formed in such shapes that the effective display areas 4b become symmetrical about the center line 6 in the second direction Note that the term "center line 6" means a straight line that is parallel to the first direction and passes through the centers of gravity of the effective display areas 4, 4a and 4b. Therefore, the center line 6 is a line that divides each of the effective display areas 4, 4a and 4b into two parts having the same size. The effective display areas 4bR, 4bG and 4bB having the respective colors contained in one aperture-ratio-adjusted picture element 5b are arranged such that their center lines 6 are aligned with one another. Further, the center lines 6 of these effective display areas 4bR, 4bG and 4bB are located on an extension line of the center line 6 of effective display areas 4 constituting picture elements 5 adjacent in the lateral direction along which the respective colors are lined up. In this way, it is possible to prevent a situation where a straight line extending in the lateral direction is curbed at the aperture-ratio-adjusted picture element 5b when displayed.

In general, when the size of the picture elements is somewhat finer than the resolution that a human can recognize, an effective display area is recognized as a light centered at the center of gravity of that effective display area regardless of the shape of the effective display area. From this fact, by aligning the center lines 6 of the effective display areas 4, 4a and 4b that are arranged in the lateral direction and located in the same row into a straight line with one another, it is recognized as a generally straight line when displayed. Furthermore, by arranging the effective display areas 4, 4a and 4b symmetrically with respect to the center line 6, visibility as the straight line is further improved. This aperture-ratio-adjusted picture element 5b is provided, among all the picture elements 5 located in the boundary portion of the display area 1, in the picture elements 5 in each of which at least one of the pixels contained in that picture element 5 overlaps with the frame area 2 and the overlapping portion does not extend beyond the center line 6 of the effective display areas 4, 4a and 4b that are arranged in the lateral direction and located in the same row.

Therefore, the shape of the effective display areas 4b is preferably defined by using one of the effective display areas 4bR, 4bG and 4bB having the respective colors contained in one aperture-ratio-adjusted picture element 5b that overlaps the most with the frame area 2 as a reference.

For example, when the B pixel interferes with the frame area 2 more than any other pixel does as shown in FIG. 4, the B effective display area 4bB is formed in such a shape that the upper side, which overlaps with the frame area 2, conforms to the shape of the display-area edge 3 and the opposite lower side is vertically symmetrical to the upper side with respect to the center line 6. Further, the R effective display area 4bR and the G effective display area 4bG are formed in the same shapes as that of the B effective display area 4bB. In this way, as shown in FIG. 4 or other figures, trapezoid-shaped effective display areas 4b for each of which the longitudinal size decreases from the left side to the right side are provided in the aperture-ratio-adjusted picture element 5b. That is, the effective display areas 4b in each of which at least one of the left side and the right side is shorter than that of effective display areas 4 provided in picture elements 5 located in areas other than the boundary portion of the display area 1 are formed. The width of the effective display areas 4b is the same as that of effective display areas 4 provided in picture elements 5 located in areas other than the boundary portion of the display area 1.

As shown in FIGS. 2 and 5, no effective display area 4 is provided in the turned-off picture elements 5c. That is, the pixel aperture ratio of the turned-off picture elements 5c is zero. In other words, it is the one that is created by turning off the whole effective display areas 4 of the picture element 5 located in an area other than the boundary portion of the display area 1. In FIGS. 2 and 5, these turned-off portions are indicated by dotted lines. Note that in FIG. 2, turned-off portions located in the frame area 2 are omitted in the drawing. In the turned-off portions, the light from the light source is shielded by, for example, the black matrix 22 or the like formed on the opposing substrate 20. Therefore, no pixel opening portion is formed in the black matrix 22 in the turned-off picture elements 5c. Consequently, the turned-off picture elements 5c do not display anything. This turned-off picture element 5c is provided, among all the picture elements 5 located in the boundary portion of the display area 1, in the picture elements 5 in each of which at least one of the pixels contained in that picture element 5 overlaps with the frame area 2 beyond the center line 6 of the effective display areas 4, 4a and 4b that are arranged in the lateral direction and located in the same row. In this way, unevenness in the color balance of the turned-off picture element 5c can be prevented. Furthermore, it is also possible to prevent a situation where a straight line extending in the lateral direction is curbed at the turned-off picture element 5c when displayed.

As has been described above, one of the normal picture element 5a, the aperture-ratio-adjusted picture element 5b, and the turned-off picture element 5c is provided in the picture elements 5 adjacent to the display-area edge 3 in this exemplary embodiment of the present invention. That is, the picture element 5 having at least one pixel overlapping with the frame area 2 becomes a aperture-ratio-adjusted picture element 5b in which the pixel aperture ratios of the respective colors are even and its center line 6 is aligned with the center line 6 of picture elements 5 adjacent in the lateral direction, or a turned-off picture element 5c in which no displaying is carried out. Therefore, each of the effective display areas 4 having the respective colors of the picture elements 5 located in the boundary portion of the display area 1 is formed in such a manner that the aperture ratios are the same within one picture element 5 and its center line 6 is located on an extension line of the center line 6 of effective display areas 4 provided in picture elements 5 adjacent in the lateral direction. Specifically, the sizes of the opening portions formed in the black matrix 22 of the opposing substrate 20 are adjusted. In this way, the color balance of picture elements located on the edge of the display area 1 become equal to that of the picture elements located within the display area 1. Furthermore, the center lines 6 of picture elements 5 arranged in the lateral direction are aligned into a straight line with one another. Therefore, it is possible to prevent unevenness in the color balance of picture elements and thus the occurrence of color shift due to such unevenness on the edge of the display area 1. Furthermore, it is also possible to prevent a situation where a straight line extending in the lateral direction is curbed at the edge of the display area 1 when displayed. Therefore, in display devices having display areas having non-rectangular shapes such as circular and oval shapes, it is possible to improve the display quality while maintaining the smooth outside edge of the actual display area in which actual displaying is carried out.

Other Exemplary Embodiments

Figure 6:
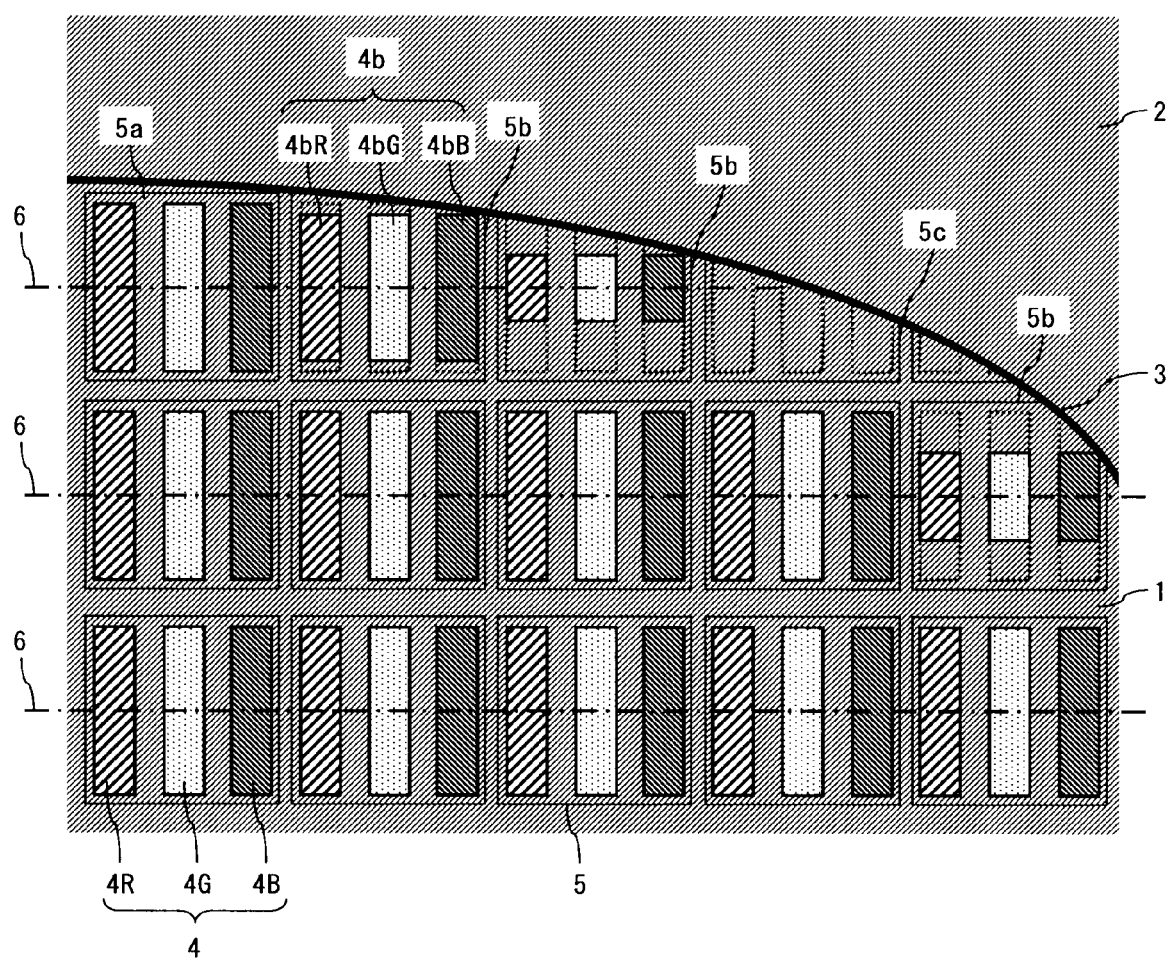
FIG. 6 is a top view schematically illustrating a structure of an edge portion of the display area of a liquid crystal display device in accordance with another exemplary embodiment of the present invention.
Figure 7:
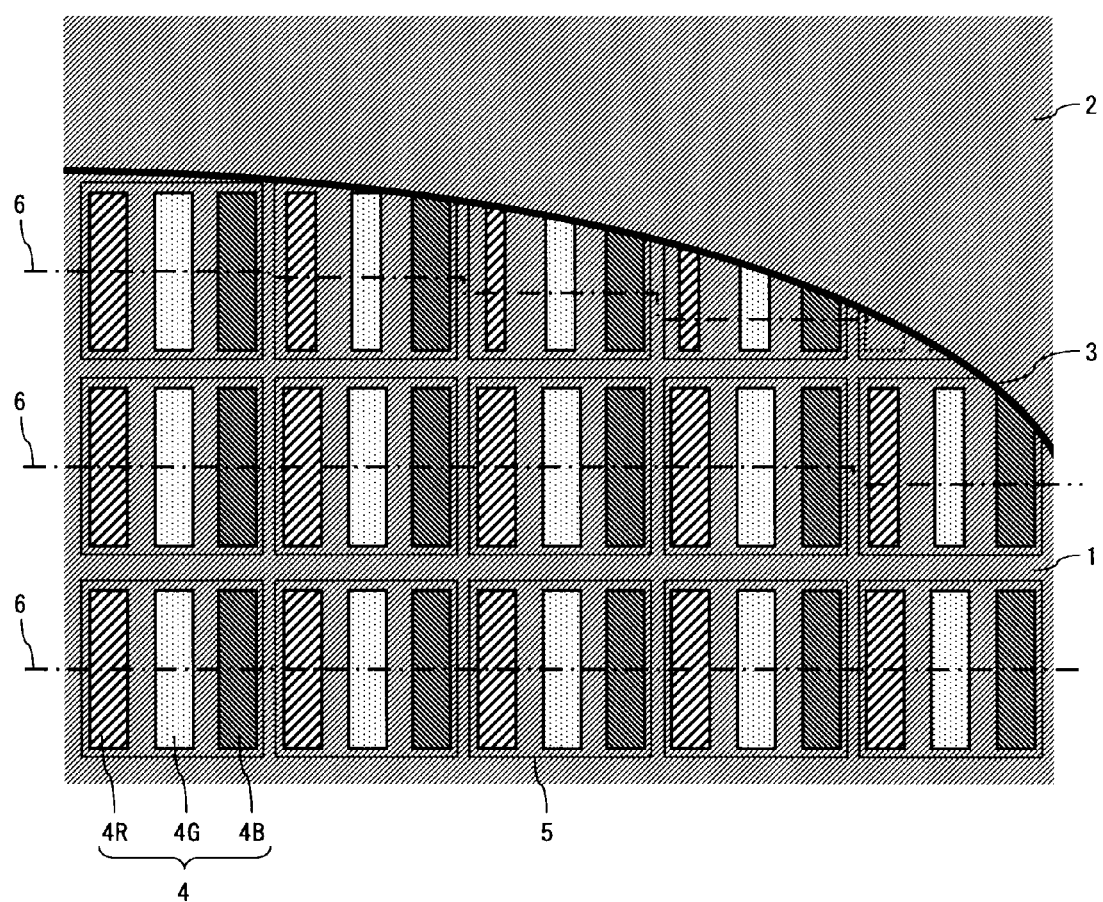
FIG. 7 is a top view schematically illustrating a structure of an edge portion of the display area of a liquid crystal display device in accordance with related art 1.
Figure 8:
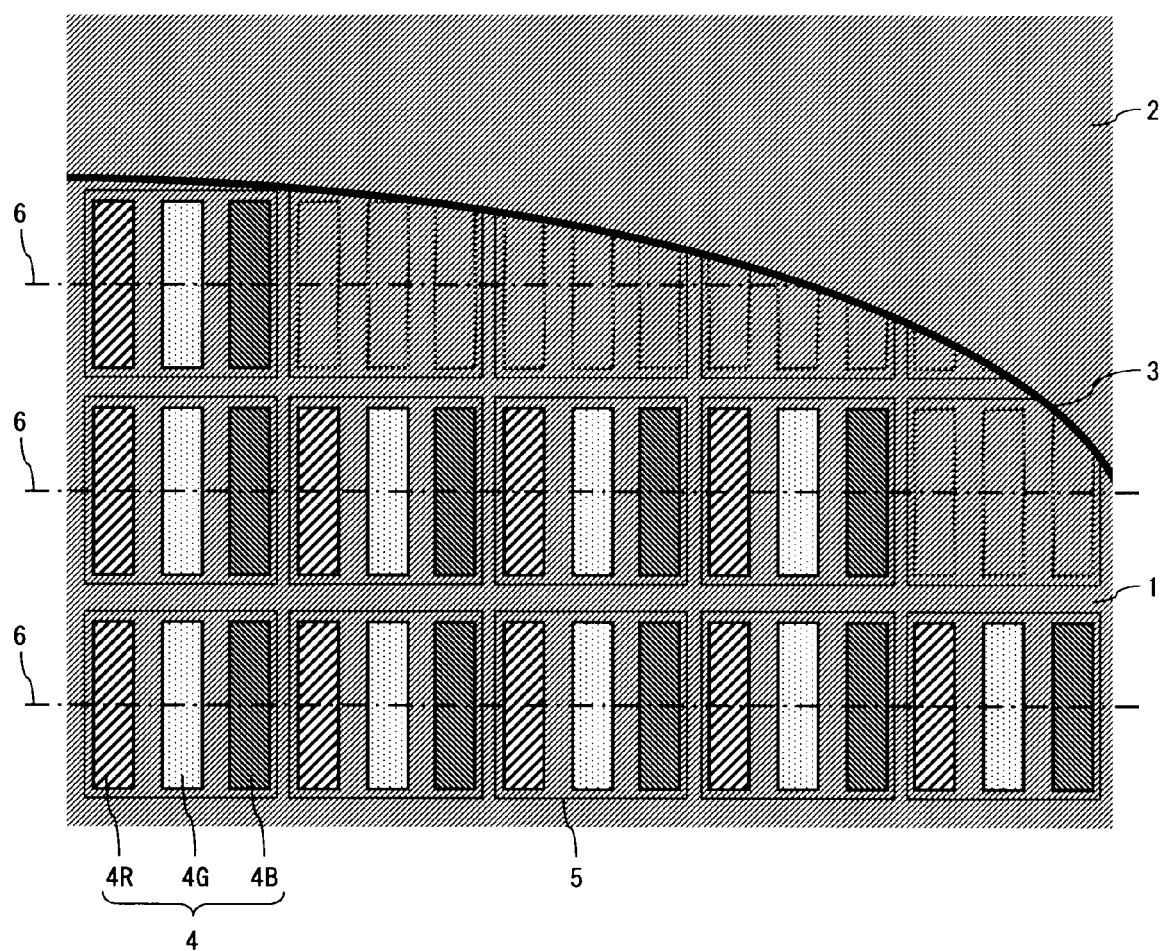
FIG. 8 is a top view schematically illustrating a structure of an edge portion of the display area of a liquid crystal display device in accordance with related art 2.

It should be noted that the shape of the effective display areas 4b is not limited to the above-described shape conforming to the shape of the display-area edge 3, and other various shapes can be also adopted. FIG. 6 is a top view schematically illustrating a structure of an edge portion of the display area of a liquid crystal display device in accordance with another exemplary embodiment of the present invention. In FIG. 6, an edge portion of the display area as viewed from the top in FIG. 1 is shown. Note that a situation where all the effective display areas are brightly displayed is shown in FIG. 6 for the sake of explanation. As shown in FIG. 6, the effective display areas 4b may be formed in, for example, a rectangular shape. As in the case of FIG. 2, the effective display areas 4bR, 4bG and 4bB having the respective colors contained in one aperture-ratio-adjusted picture element 5b are formed in identical shapes. Further, the effective display areas 4bR, 4bG and 4bB having the respective colors contained in one aperture-ratio-adjusted picture element 5b are arranged such that their center lines 6 are aligned into a straight line with the center line 6 of picture elements 5 arranged in the lateral direction. In this way, the designing becomes simpler.

Furthermore, although the effective display areas 4b are formed such that their pixel aperture ratios for the respective colors become even, the present invention is not limited to such a configuration. For example, when the effective display areas 4 having the respective colors contained in one picture element 5 are designed so that their pixel aperture ratios have a predetermined ratio, this ratio is also applied to the aperture-ratio-adjusted picture elements 5b. In such a case, it is necessary to adjust the shapes and the positions of the effective display areas 4bR, 4bG and 4bB having the respective colors as appropriate so that the center lines 6 of picture elements 5 arranged in the lateral direction become a straight line.

Note that although cases where the turned-off portions of the aperture-ratio-adjusted picture elements 5b and the turned-off picture elements 5c are shielded by the black matrix 22 formed on the opposing substrate 20 have been explained as examples, the present invention is not limited to such structures. The turned-off portions may be shielded by the layer that constitutes the array substrate 10. Alternatively, the turned-off portions may be formed by modifying the shapes of the pixel electrodes 16 formed on the array substrate 10. That is, the pixel electrodes 16 themselves may be formed in the shapes of the effective display areas 4. In this way, portions where no pixel electrode 16 is arranged can be used as turned-off portions.

Furthermore, the arrangement of the pixels composed of R, G and B can be selected as appropriate from a stripe arrangement, a mosaic (diagonal) arrangement, and a delta (triangle) arrangement. Note that display devices in accordance with this exemplary embodiment of the present invention have been explained by taking liquid crystal display devices as examples, the present invention is not limited to these liquid crystal display devices. For example, the present invention is also applicable to display devices using display material other than liquid crystal, such as organic EL (electroluminescence) and electronic paper.

Note that in this specification, the term "shape of a display area" means a shape that is recognized as a brightly displayed area by an observer when the entire effective display area is brightly displayed. For example, in the case of a typical rectangular liquid crystal panel, it conforms to a rectangular shape containing the outside lines of effective display areas of pixels located in the outermost area in the pixels arranged in an array. Further, in the case of a circular or an oval liquid crystal panel, it generally conforms to a curved line surrounding all the effective display areas and created by smoothly extrapolating the outside lines of effective display areas of pixels located in the outermost area. Furthermore, when the shape of the display area is composed of a curved line as explained above, the shape recognized by an observer is slightly variable depending on the shapes of the effective display areas of pixels in the boundary area. Therefore, when a display area is described to have a circular or an oval shape in this specification, it includes not only an exact circular or oval shape but also shapes slightly deformed from it.

Furthermore, although this exemplary embodiment of the present invention has been explained by using a circular or an oval display area, similar advantageous effects of the present invention are also obtained in other cases where the display area has a shape that cannot completely filled up by rectangular pixels. Therefore, the present invention is not limited to those shapes, and similar advantageous effects to those of this exemplary embodiment are obtained in any other non-rectangular shape, provided that it is a shape surrounded by an outside shape having a tangential direction other than the two mutually-orthogonal directions, such as a polygon (polygon having five sides or more) and, in particular, a shape surrounded by a curved line.

The above explanation has been made only for explaining exemplary embodiments of the present invention, and the present invention is not limited to those exemplary embodiments. Furthermore, those skilled in the art can make modifications, additions, and conversions on any component of the above-described exemplary embodiment of the present invention without departing from the scope of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:
1. A display device comprising: a non-rectangular display area; a frame area surrounding the display area;
   a plurality of picture elements arranged in the display area; and a plurality of effective display areas having respective colors provided in the picture element, wherein each of the plurality of effective display areas having respective colors provided in the picture element located in a boundary portion of the display area is formed such that aperture ratios are the same within one picture element and that center lines in terms of a second direction perpendicular to a first direction along which each color of the effective display areas having respective colors is lined up are located on an extension line of the center line of effective display areas provided in the picture element adjacent in the first direction, at least one picture element located in said boundary portion having smaller effective display areas than that of a non-boundary picture element.

2. The display device according to claim 1, wherein in the picture element located in the boundary portion of the display area, each of the plurality of effective display areas having respective colors is formed in a same shape within one picture element.

3. The display device according to claim 1, wherein in the picture element located in the boundary portion of the display area, each of the plurality of effective display areas having respective colors is formed in symmetrical about the center line.

4. The display device according to claim 1, wherein the picture element in which at least one of the plurality of effective display areas having respective colors is shielded by the frame area beyond the center line is turned off.

5. The display device according to claim 1, wherein the display device is a liquid crystal display device including liquid crystal filled between an array substrate and an opposing substrate.

6. The display device according to claim 5, further comprising:
   a black matrix formed on the opposing substrate and having an opening portion; and
   a colored layer provided in the opening portion of the black matrix,
   wherein in the picture element located in the boundary portion of the display area, a size of the opening portion of the black matrix is adjusted so that aperture ratios of the plurality of effective display areas having respective colors is the same within one picture element.

* * * * *